United States Patent [19]

Reynolds

[11] 4,137,250

[45] Jan. 30, 1979

[54] LIQUID CRYSTAL COMPOUNDS AND COMPOSITION

[75] Inventor: Reese M. Reynolds, Phoenix, Ariz.

[73] Assignee: Motorola, Inc., Schaumburg, Ill.

[21] Appl. No.: 760,594

[22] Filed: Jan. 19, 1977

Related U.S. Application Data

[63] Continuation of Ser. No. 554,937, Mar. 3, 1975, abandoned.

[51] Int. Cl.² ............... C07C 153/11; C09K 3/34; G02F 1/13
[52] U.S. Cl. ............... 260/455 R; 252/299; 350/350
[58] Field of Search ............... 260/455 R; 252/299; 350/160 LC, 350

[56] References Cited

PUBLICATIONS

Rheinboldt, H., et al., "Binary Systems of Aromatic Esters and Thioesters", Chem. Abst., 1952, 7555A.
Martens, J., et al., "Organosulfur Compounds, VII, Photochemical α-Cleavage of S-p-tolyl Thiobenzoates in Solution", Chem. Ber. 107, 2319–2325 (1974).

*Primary Examiner*—Lewis Gotts
*Assistant Examiner*—Robert C. Whittenbaugh
*Attorney, Agent, or Firm*—John A. Fisher

[57] ABSTRACT

Novel compounds exhibiting liquid crystal properties have the formula

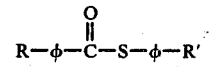

wherein $\phi$ is a benzene ring containing hydrogen atoms or an inert substituent therefor at other than the para position, and R and R' are, independently in each case, a hydrocarbyl group containing from about 1 to about 20 carbon atoms, a nitrogen containing group, or a halogen. Novel liquid crystal compositions include at least one of these compounds, preferably present in a mixture of at least two homologous liquid crystal compounds in substantially eutectic proportions. These liquid crystal compounds and compositions have greater nematic stability than their corresponding disubstituted phenylbenzoate analogs. They may be used in liquid crystal displays, particularly field effect nematic liquid crystal displays.

2 Claims, 1 Drawing Figure

LIQUID CRYSTAL COMPOUNDS AND COMPOSITION

This is a continuation, of application Ser. No. 554,937, filed 3-3-75 now abandoned.

FIELD OF THE INVENTION

This invention relates to a new class of organosulfur compounds. More particularly, it relates to such a class of compounds which may be denominated as p-p'-disubstituted phenylbenzthiolates. Most especially, it relates to p-p'-disubstituted phenylbenzthiolates which exhibit liquid crystal properties and to liquid crystal compositions including these compounds. It further relates to liquid crystal displays in which at least one of these compounds is present in the liquid crystal composition of the display.

DESCRIPTION OF THE PRIOR ART

There is a considerable variety of organic compounds that exhibit crystal properties. The most work has been done with Schiff base liquid crystal compounds because they have hitherto shown the most promise in meeting performance specifications for liquid crystal displays. However, the Schiff base liquid crystal compounds tend to have stability problems, and attention has therefore focused more recently on ester based compositions, such as those made up of phenlbenzoate esters. For example, phenylbenzoate ester liquid crystal compounds and compositions are disclosed by Maze et al in commonly assigned, copending application Ser. No. 477,562, filed June 10, 1974, and such liquid crystal compositions have begun to achieve commercial acceptance. Compositions prepared in accordance with the teachings of that application and based on disubstituted phenylbenzoate esters have both a broader operable temperature range and increased stability over the Schiff bases.

In order to meet the most stringent liquid crystal composition performance specifications, it would be desirable to have a composition with an even further increase in the temperature range over which the composition exhibits liquid crystal properties, particularly at the upper end of the temperature range, i.e., the clearing or nematic isotropic temperature.

Some work has been carried out with sulfur analogs of oxygen containing liquid crystal compounds, but the compounds studies failed to exhibit liquid crystal properties. Dewar et al, "Effect of Structure on the Stability of Nematic Mesophases", a paper presented at the 166th National ACS Meeting, Chicago, Ill., August, 1973, disclose monotropic liquid crystal compounds with oxygen containing heterocyclic central linkages. When the oxygen of the heterocyclic central linkage was replaced with sulfur, the resulting compound did not exhibit liquid crystal properties. Similarly, Van Meter and Klanderman in "Mesomorphic Properties of Some Phenylbenzoate Derivatives", a paper presented at the 4th International Liquid Crystal Conference, Kent, Ohio, August, 1972, prepared phenylbenzoate ester compounds in which alkoxy terminal substituents were replaced with thioalkyl terminal substituents.. None of the sulfur containing compounds they prepared exhibited liquid crystal properties. Furthermore, they concluded that terminal sulfur containing groups destabilized the nematic phase of the compounds studied.

SUMMARY OF THE INVENTION

It has now been discovered that certain sulfur containing organic compounds exhibit very desirable liquid crystal properties. These new organic compounds are p-p' disubstituted phenylbenzthiolates. These phenylbenzthiolate compounds desirably have the formula:

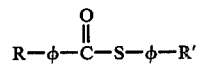

wherein $\phi$ is a benzene ring containing hydrogen atoms or an inert substituent therefor at other than the para position. R and R' are, independently in each case, a hydrocarbyl group containing from about 1 to about 20 carbon atoms, a nitrogen containing group, or a halogen. These compounds are desirably prepared by a condensation reaction between a p-substituted benzoyl chloride and a p-substituted thiophenol. They may be used in admixture with other phenylbenzthiolates to provide a liquid crystal composition, in admixture with phenylbenzoate esters, or in admixture with other types of liquid crystal compounds. The phenylbenzthiolates of this invention have increased nematic stability as shown by higher clearing points than conventional prior art liquid crystal compounds. They may therefore be used to give a liquid crystal display, especially a nematic field effect liquid crystal display, having improved operating characteristics.

DETAILED DESCRIPTION OF THE INVENTION

Figure 1:
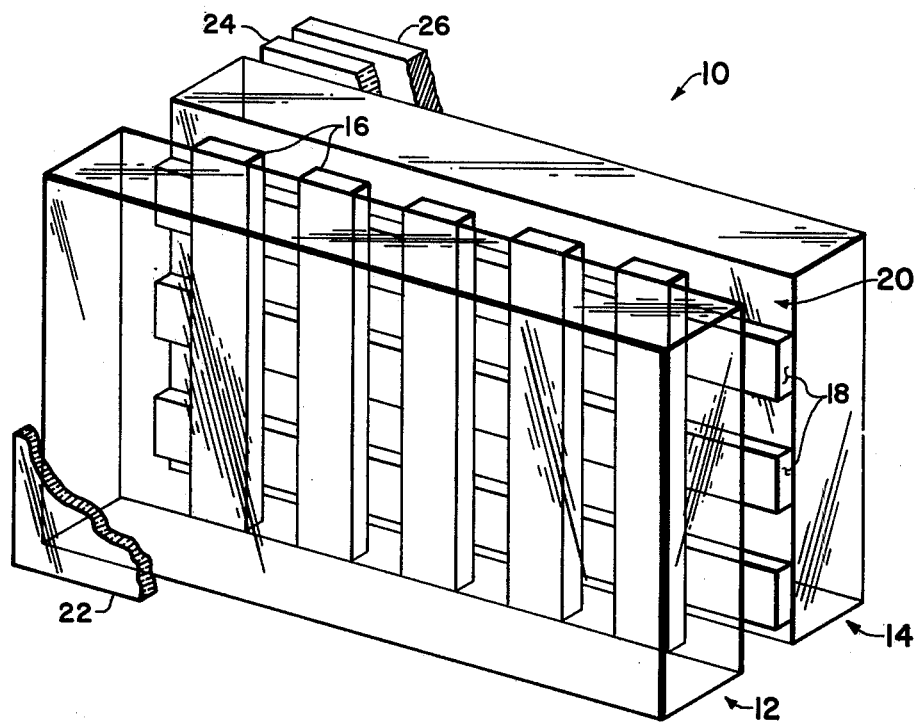

In compounds of the invention having the above general formula, R and R' may be, independently in each case, an alkyl or alkoxy group, either linear or branched chain, such as a methyl, ethyl, methoxy, ethoxy, pentyl, pentyloxy, heptyl or heptyloxy group, or the like; an aryl group, such as a phenyl group, or the like; an alkyl aryl group, such as an ethyl phenyl group, or the like; an aryl alkyl group, such as a phenethyl group, or the like; a nitrogen containing group, such as a cyano, nitro, dimethylamino, or azide group, or the like; or a halogen, such as fluorine, chlorine, bromine or iodine. The central aromatic rings indicated in the above general formula by the symbol $\phi$ may contain one or more lateral substituents for their hydrogen atoms at other than the para position. Suitable inert substituents for this purpose include halogens, such as chlorine and bromine, lower alkyl and alkoxy groups containing from about 1 to 5 carbon atoms, such as methyl, methoxy, ethyl and ethoxy groups, hydroxyl groups, and the like. The incorporation of such substituents does not change the basic liquid crystalline character of the compounds.

The p-p'-disubstituted phenylbenzthiolates of the invention are desirably synthesized by a condensation reaction of a p-substituted benzoyl chloride and a p-substituted thiophenol, in accordance with the following reaction, under conventional reaction conditions:

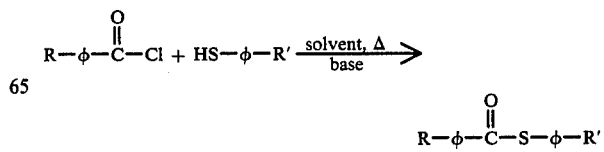

A non-polar solvent, such as benzene is used, and the reaction mixture is heated to reflux temperature. The resulting reaction product may be purified by recrystallization or distillation in accordance with known procedures.

The p-substituted benzoyl chloride precursors may be either commercially obtained or synthesized via an acylation of alkyl benzenes using oxalyl chloride in a known manner. The p-substituted thiophenols, which in most cases are not commercially available, may be obtained by the three-step synthesis shown below:

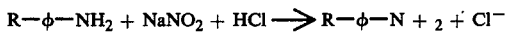   1.

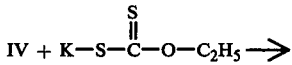   2.

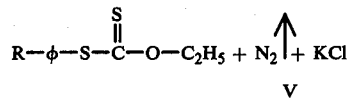

$V + \text{Base} \longrightarrow R-\phi-SH$   3.

While the pure compounds of the invention exhibit liquid crystal properties themselves, the usual practice is to utilize them for preparing liquid crystal compositions containing at least one p-p'-disubstituted phenylbenzthiolate. They may be mixed in substantially any proportion with substantially any other liquid crystal compound, depending on the phenylbenzthiolate employed, the other liquid crystal compound employed, and the desired performance specification of the resulting mixture. Thus, the phenylbenzthiolates of this invention can be blended with, for example, Schiff base, ester, tolan, stilbene, azo, axoxy, cinnamate ester, nitrone, and the like liquid crystal compounds. It is preferred that liquid crystal compositions including p-p'-disubstituted phenylbenzthyiolates in accordance with the invention be prepared as euthetic mixtures in accordance with the teaching of the above reference Maze et al application, the disclosure of which is incorporated by reference herein. Thus, it is preferred to provide a substantially eutectic mixture of at least two homologous liquid crystal compounds in the mixture. The substantially eutectic mixture of at least two homologous liquid crystal compounds may then be treated as a single component of the mixture, and blended with at least one additional liquid crystal compound in substantially eutectic proportions. It is especially preferred to utilize a plurality of components, each consisting of a substantially eutectic mixture of at least two homologous liquid crystal compounds. At present, best results appear to be obtainable with at least one substantially eutectic mixture of at least two homologous p-p'-disubstituted phenylbenzthiolates and at least one substantially eutectic mixture of at least two homologous p-p'-disubstituted phenylbenzoate esters, such as eutectic mixture being present in substantially eutectic proportions with the other eutectic mixture to give an overall substantially eutectic composition.

The sole FIGURE shows one form of a twisted nematic field effect liquid crystal display 10 in accordance with the invention. The display comprises two substrates, 12 and 14, having sets of electrodes 16 and 18 deposited thereon. Electrodes 16 and 18 comprise strip electrodes each set of which is aligned perpendicular with respect to the other set of electrodes to define a matrix of points which will carry electrical current to excite the liquid crystal material 20 contained therebetween by means of the resulting electrical field. A first polarizer 22 is located on one side of the display 10, and a second polarizer 24 is located on the other side of the display 10, and is parallel to the first polarizer. If the display 10 is utilized in a light transmission mode, both the substrates 12 and 14 and electrodes 16 and 18 will be of a suitably transparent dielectric and conductive material respectively; for example, the substrates 12 and 14 may be glass while the elecgtrodes 16 and 18 may be of a transparent conductor such as tin oxide. If the display 10 is to be utilized in a reflection mode, reflecting layer material 26, such as of aluminum, is provided at the back of the display. The spacing between electrodes 16 to 18 is approximately 10 to 1,000 microns and contains a liquid crystal composition including at least one p-p' disubstituted phenylbenzthiolate compound. Where the liquid crystal composition is activated, light will pass through the parallel polarizers 22 and 24, and be reflected back through the cell by layer 26. Where the liquid crystal composition is quiescent or unactivated, its molecules rotate the light by an angle of 90°, so that its passage through the display 10 is inverted by the polarizers. Further details on the structure and operation of twisted nematic and other types of liquid crystal displays which may include the present invention are available in an article by Richard W. Gurtler and Craig Maze, entitled "Liquid Crystal Displays", IEEE spectrum, November 1972, pp. 25-29, the disclosure of which is incorporated by reference herein.

The following non-limiting examples represent preferred embodiments and describe the invention further. In the following examples, the general procedure used consisted of first condensing a p-substituted benzoyl chloride and a p-substituted thiophenyl in benzene at reflux temperature, using a stoichiometric equivalent of pyridine as an acid scavenging agent. After stirring 14 to 48 hours, depending on the compound being prepared, the reaction was cooled to room temperature, diluted and washed successively with water, dilute phosphoric acid, saturated aqueous sodium bicarbonate and water. The organic solution was dried, then concentrated in vacuo. Final purification was obtained by either recrystallization or vacuum distillation.

The nematic range for each compound so prepared was determined on a hot stage mounted on a microscope with cross-polarized lenses or on a Model DSC-2 differential scanning calorimeter, obtained from the Perkin Elmer Corporation, Norwalk, Connecticut. Purity measurements were made on the differential scanning calorimeter using a computer assisted DSC-4 purity program supplied by the Perkin Elmer Corporation. The structure of the compounds produced was confirmed by infrared spectroscopy and elemental analysis.

EXAMPLE 1:

p-'Pentylphenyl-p-ethoxybenzthiolate

To a solution of 2.02 g (0.011 mole = 10% excess) p-ethoxybenzoyl chloride and 1.80g (0.010 mole) p-n-pentylthiophenol and 25 ml of benzene was added 0.80 ml (0.010 mole) of pyridine. The reaction mixture was heated to 70° C and stirred for 24 hours. At the end of this time, during which pyridinium hydrochloride precipitated out, the reaction mixture was cooled to room, temperature and transferred to a separatory funnel using 100 ml of benzene as a wash. The organic phase was washed two times with 100 ml water, two times with 3 volume percent phosphoric acid, once with 100 ml water, two times with a saturated solution of sodium bicarbonate and, finally, two times with 100 ml of water. The organic phase was dried by shaking with molecular sieves for 1 hour. The molecular sieves were filtered off and the solution concentrated to dryness in vacuo. The resultant white powder was recrystallized once in an ether and petroleum ether mixture followed by a final recrystallization in ether. The product had a melting point of 80.0° C and a nematic isotropic temperature of 97.5° C. It had a mole percent purity of 99.958 percent and an infrared spectrum that conformed to the expected structure. An elemental analysis gave 73.17 weight percent carbon, 7.42 weight percent sulfur, compared with theoretical values of 73.13 weight percent, 7.36 weight percent, 9.74 weight percent, and 9.77 weight percent, respectively.

EXAMPLES 2-8.

A series of p-p'-disubstituted phenylbenzthiolates was prepared from the corresponding p-substituted benzoyl chlorides and p-substituted thiophenols in accordance with the above procedure to give the compounds shown in Table 1.

TABLE I

| Structure & Name | Nematic Range | Oxygen Ester Analog Nematic Range |
|---|---|---|
| 2. $CH_3O\phi-\overset{O}{\underset{\|}{C}}S-\phi-C_5H_{11}$ p'-pentylphenyl-p-methoxybenzthiolate | 64.8–75.0° C | 29–42° C |
| 3. $C_5H_{11}O\phi-\overset{O}{\underset{\|}{C}}S-\phi-C_5H_{11}$ p'-pentylphenyl-p-pentyloxybenzthiolate p'-pentylphenyl-p-methoxybenzthiolate | 64.0–79.4° C | 38–52° C |
| 4. $C_7H_{15}O\phi-\overset{O}{\underset{\|}{C}}S-\phi-C_4H_9$ p'-butylphenyl-p-heptyloxybenzthiolate | 56.9–74.0° C | 45–61° C |
| 5. $C_4H_9\phi-\overset{O}{\underset{\|}{C}}S-\phi-C_5H_{11}$ p'-pentylphenyl-p-butylbenzthiolate | 28.1–33 | [21.5] monotropic |
| 6. $\phi-\phi-\overset{O}{\underset{\|}{C}}S-\phi-NO_2$ p'-nitrophenyl-P-phenylbenzthiolate | 184–193 | [159° C] monotropic |
| 7. $C_7H_{15}O\phi-\overset{O}{\underset{\|}{C}}S-\phi-NO_2$ p'-nitrophenyl-p-heptyloxybenzthiolate | 69–85° C | |
| 8. $C_7H_{15}O\phi-\overset{O}{\underset{\|}{C}}S-\phi-F$ p'-fluorophenyl-p-heptyloxybenzthiolate | | [67° C] monotropic |

In each case, the identity of the resulting product was confirmed by infrared spectroscopy and elemental analysis.

Table 1 gives the nematic range for each of the compounds, with the lower temperature indicating the melting point of the material and the upper temperature indicating the clearing or nematic isotropic temperature. As indicated, p-fluorophenyl-p-heptyloxybenzthiolate exhibits monotropic liquid crystal properties, i.e., it exhibits liquid crystal properties upon cooling but not upon heating. For comparative purposes, the nematic range for the corresponding oxygen ester analogs of each compound are given in Table 1, where available.

The above examples show that p-p'-disubstituted phenylbenzthiolates having a wide variety of substituents exhibit useful nematic liquid crystal properties. In each case for which comparative data is available, the phenylbenzthiolates have a higher nematic range than their corresponding oxygen ester analogs.

Substitution of other corresponding p-substituted benzoyl chlorides and p-substituted thiophenols in the above procedure to give other p-p'-disubstituted phenylbenzthiolates gives similar advantageous results.

EXAMPLE 9:

Liquid Crystal Mixtures p-p'-disubstituted phenylbenzthiolates are used as components of liquid crystal mixtures as follows:

A hexanary eutectic liquid crystal composition is prepared in accordance with the procedure taught in the above-referenced Maze et al application, except that an eutectic mixture of two p-p' disubstituted phenylbenzthiolates is included. The composition is as shown in Table II.

TABLE II

| COMPONENT | WEIGHT PERCENT |
|---|---|
| $C_5H_{11}O-\phi-\overset{O}{\underset{\|}{C}}-O-\phi-CN$ | 17.4% |
| $C_7H_{15}O-\phi-\overset{O}{\underset{\|}{C}}-O-\phi-CN$ | 11.6% |
| $C_5H_{11}-\phi-\overset{O}{\underset{\|}{C}}-O-\phi-CN$ | 21.6% |
| $C_7H_{15}-\phi-\overset{O}{\underset{\|}{C}}-O-\phi-CN$ | 32.4% |
| $CH_3O-\phi-\overset{O}{\underset{\|}{C}}S-\phi-C_5H_{11}$ | 8.5% |
| $C_5H_{11}O\phi-\overset{O}{\underset{\|}{C}}S-\phi-C_5H_{11}$ | 8.5% |

This composition has a nematic temperature range of 2° C to 64° C, an optical threshold voltage of about 1.0 volt and a response time of 102%, expressed as a percentage relative to the response time of Kodak Field Effect Mixture II, obtained from the Eastman Kodak Company, Rochester, N.Y. For comparative purposes, if the two p-p' disubstituted phenylbenzthiolates are replaced by the corresponding phenylbenzoate esters in the same amount, the composition has a nematic temperature range of −5° C to 58° C, an optical threshold voltage of about 1.0 volt, and a response time of 115%. The phenylbenzthiolates thus give a higher nematic clearing temperature and a faster response time.

EXAMPLE 10:

The quaternary eutectic liquid crystal mixtures are prepared, one consisting of two homologous binary eutectic phenylbenzoate mixtures, the other consisting of a homologous binary eutectic phenylbenzoate mixture and a homologous binary eutectic phenylbenzthiolate mixture. The three different homologous binary eutectic mixtures utilized are as shown in Table III.

TABLE III

| EUTECTIC | COMPOUNDS | WEIGHT PERCENT |
|---|---|---|
| 1. | p'-cyanophenyl-p-heptylbenzoate | 60% |
| | and | |
| | p'-cyanophenyl-p-pentylbenzoate | 40% |
| 2. | p'-pentylphenyl-p-methoxybenzoate | 70% |
| | and | |
| | p'-pentylphenyl-p-pentyloxybenzoate | 30% |
| 3. | p'-pentylphenyl-p-ethoxybenzthiolate | 50% |
| | and | |
| | p'-pentylphenyl-p-pentyloxybenzthiolate | 50% |

The first quaternary eutectic mixture consisted of 61.5 weight percent of eutectic 1 and 38.5 weight percent of eutectic 2 to give an all phenlbenzoate composition. This mixture had a clearing point of 48° C and a response time of 75%. The second quaternary eutectic mixture consisted of 61.5 weight percent of eutectic 1 and 38.5 weight percent of eutectic 3 to give a phenylbenzoate-phenylbenzthiolate mixture. This mixture had a clearing point of 64.8° C and a response time of 70 percent.

A striking aspect of these phenylbenzthiolate containing liquid crystal compositions in that they gave both an increased clearing point and a lower response time than their corresponding oxygen analogs. Previously, clearing points as high as obtained with these compounds were only obtainable with three ring liquid crystal compounds, and these increase the response time as well as the clearing point.

Liquid crystal compositions including p-p'-disubstituted phenylbenzthiolates in admixture with the other liquid crystal compounds may be prepared with similar advantageous results, with the phenylbenzthiolates giving an increased clearing or nematic isotropic temperature to the mixtures, as well as a shorter response time. Similarly, other p-p'-disubstituted phenylbenzthiolates may be substituted in the mixtures given above with similar advantageous results.

While the invention has been shown and described with respect to preferred embodiments thereof, it should be readily apparent that the foregoing and other changes in form and details of the invention may be made. It is intended that such changes be included within the spirit and scope of the claims appended hereto.

What is claimed is:

1. A p-p'- disubstituted phenylbenzthiolate compound of the formula

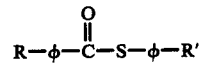

where $\phi$ is a benzene ring containing hydrogen atoms at other than the para position, and R and R' are, independently in each case, an alkyl or aryl group containing from 1 to 8 carbon atoms with at least one of R and R' having at least 2 carbon atoms, a nitro group or fluorine.

2. A compound in accordance with claim 1 wherein R is selected from the group consisting of $C_4H_9$ and $\phi$ and R' is selected from the group consisting of $C_4H_9$, $C_5H_{11}$, $NO_2$, and F.

* * * * *